(12) United States Patent
Hoch et al.

(10) Patent No.: US 9,291,469 B2
(45) Date of Patent: Mar. 22, 2016

(54) METHOD AND DEVICE FOR PLANNING A TRAVEL ROUTE FOR A VEHICLE

(75) Inventors: Nicklas Hoch, Hannover (DE); Bernd Werther, Klein Vahlberg (DE); Peter Anders, Vechelde (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/008,852

(22) PCT Filed: Mar. 16, 2012

(86) PCT No.: PCT/EP2012/001180
§ 371 (c)(1),
(2), (4) Date: Oct. 29, 2013

(87) PCT Pub. No.: WO2012/130397
PCT Pub. Date: Oct. 4, 2012

(65) Prior Publication Data
US 2014/0052373 A1 Feb. 20, 2014

(30) Foreign Application Priority Data
Apr. 1, 2011 (DE) .......................... 10 2011 015 777

(51) Int. Cl.
G01C 21/34 (2006.01)
G08G 1/123 (2006.01)
G08G 1/0968 (2006.01)

(52) U.S. Cl.
CPC ...... *G01C 21/3469* (2013.01); *G08G 1/096822* (2013.01); *G08G 1/096844* (2013.01); *G08G 1/096866* (2013.01)

(58) Field of Classification Search
CPC .................... G01C 21/3469; G08G 1/096822; G08G 1/096844; G08G 1/096866
USPC .......................................................... 701/533
See application file for complete search history.

(56) References Cited

U.S. PATENT DOCUMENTS 5,790,976 A * 8/1998 Boll et al. .................. 455/456.5
8,417,401 B2 * 4/2013 Takahara et al. ................. 701/22
(Continued)

FOREIGN PATENT DOCUMENTS

DE 195 19 107 4/1996
DE 100 59 746 10/2001
(Continued)

OTHER PUBLICATIONS

International Search Report, mailed Apr. 29, 2013, issued in corresponding International Application No. PCT/EP2012/001180.
(Continued)

*Primary Examiner* — Maceeh Anwari
(74) *Attorney, Agent, or Firm* — Kenyon & Kenyon LLP

(57) ABSTRACT

A method for planning a travel route for a vehicle including an energy storage unit includes a) transmitting a destination sequence to an arithmetic logic unit coupled to a data memory storing data concerning a road network, b) calculating a route sequence for the destination sequence, c) calculating a projected amount of energy remaining in the energy storage unit for the route sequence, d) ascertaining, at least for one destination in the destination sequence, based on the projected amount of energy remaining, the road network and a projected energy consumption, points in the road network still reachable from this destination with the projected amount of energy remaining, and e) generating, for at least the one destination, a graphic map depiction in which this destination and the points in the road network still reachable from this destination are visually represented. A corresponding device for carrying out the method is also described.

21 Claims, 8 Drawing Sheets

(56) References Cited

U.S. PATENT DOCUMENTS

| | | |
|---|---|---|
| 2010/0094496 A1 | 4/2010 | Hershkovitz et al. |
| 2011/0032110 A1 | 2/2011 | Taguchi |

FOREIGN PATENT DOCUMENTS

| | | |
|---|---|---|
| DE | 101 46 789 | 4/2003 |
| DE | 103 02 504 | 9/2004 |
| DE | 10 2005 055 243 | 5/2005 |
| DE | 10 2004 022 265 | 12/2005 |
| DE | 10 2008 030 563 | 12/2009 |
| DE | 10 2009 053 982 | 6/2010 |
| DE | 10 2010 039 075 | 2/2011 |
| EP | 1 201 849 | 5/2002 |
| EP | 1 300 817 | 4/2003 |
| EP | 2 172 740 | 4/2010 |
| WO | WO 2010/033517 | 3/2010 |

OTHER PUBLICATIONS

German Search Report, mailed Aug. 31, 2011, issued in corresponding German Patent Application No. 10 2011 015 777.8.

* cited by examiner

METHOD AND DEVICE FOR PLANNING A TRAVEL ROUTE FOR A VEHICLE

FIELD OF INVENTION

The present invention relates to a method and a device for planning a travel route for a vehicle. The vehicle includes an energy storage unit for storing the energy to power the vehicle, especially a rechargeable battery. Additionally or alternatively, a conventional drive with the aid of a fuel may also be provided. Thus, in particular, the vehicle is what is referred to as an electric-powered vehicle or a hybrid vehicle.

BACKGROUND INFORMATION

For the user of a vehicle, there is often the problem that he/she must honor various appointments at various locations within a specific period of time. For that, a travel route should be planned for the vehicle. In so doing, the travel route should be planned such that the user will reach the locations at which the appointments are taking place in time with the vehicle. In the process, it must be taken into account that from time to time, the energy storage unit must be replenished again. Particularly in the case of electric-powered vehicles, the charging of the battery must be integrated as well as possible into the travel-route planning, since the traveling range of an electric-powered vehicle is usually substantially less than that of a conventional vehicle which is powered by a fuel.

German Application No. DE 195 19 107 describes a route-advisor device especially for an electric-powered vehicle. The device described includes a data-input unit for the input of one or more destinations for a trip and a road-network memory for storing the locations on the road network able to be traveled by the vehicle, and the associated location distances. The device further includes a computer unit for determining one or more possible routes from the vehicle location to the destinations, including necessary energy-feeding operations at one or more energy-feeding locations as a function of the amount of energy available in the energy storage unit, the energy-fueling network and the itinerary-specific energy consumption. Finally, the device includes a display unit for displaying the routes determined by the arithmetic logic unit.

German Application No. DE 10 2004 022 265 describes a method for working out a route from a point of departure to a destination in a navigation system. In the method, one factor which influences the energy consumption in traveling the route is taken into account when working out the route.

German Application No. DE 100 59 746 describes a method for computer-assisted travel-route planning and travel-route guidance, which takes dynamic changes in the traffic situation and changes of appointments into account.

European Application No. EP 1 300 817 describes a navigation-data provision system. In this system, route data is sent out, which is selected as a function of user-preference data. The route data is received by a navigation terminal and used for the road routing for the vehicle.

European Application No. EP 1 201 849 describes a method and a device for assigning parking space. In the method, an inquiry about a parking possibility is made via a transceiver in a vehicle to the device for assigning parking space. This inquiry includes information about the current position of the vehicle. Based on this, the device ascertains the nearest available parking possibility and transmits it as destination information to the vehicle. Subsequently, the anticipated time of arrival is calculated, and at a predefined lead time prior to the anticipated time of arrival, it is checked whether the ascertained parking possibility is still available. If the parking possibility is available, the option exists to reserve it for the vehicle. If the parking possibility is no longer available, the device determines a new parking possibility and transmits corresponding information to the vehicle.

German Application No. DE 103 02 504 describes a method for determining the traveling range of an electric-powered vehicle. In the method, vehicle-related, route-related and/or environment-related information about the vehicle and a route planned or a route presently to be traveled are ascertained by a vehicle computer and processed. From this information, the remaining traveling range of the electric-powered vehicle is calculated and displayed.

German Application No. DE 10 2005 055 243 describes a method for determining a road routing for a vehicle which is favorable from the standpoint of energy. In the method, the starting point and the end point of the itinerary is input. In addition, vehicle-specific information, particularly charging information is made available. The vehicle-specific information provided is compared to stored itinerary data in the form of vehicle-specific information and energy consumption. Thereupon, a route with minimized energy consumption is selected based on the stored itinerary data as a function of the vehicle-specific information provided, as well as the starting point and end point. Finally, the data concerning the selected road routing is output.

German Application No. DE 10 2009 053 982 describes a system for calculating a motor-vehicle route optimized from the standpoint of consumption. The system has a position receiver, a traffic-information receiver and an arithmetic logic unit, with whose aid a route to a destination is able to be calculated. The arithmetic logic unit is able to calculate a route optimized in terms of consumption, using the vehicle-individual and/or driver-individual consumption-relevant data.

SUMMARY

A technical problem underlying the present invention is to provide a method and a device of the type indicated at the outset, by which an optimal travel route may be planned as a function of appointment data.

The vehicle for which the travel route is to be planned includes an energy storage unit for storing the energy to power the vehicle, e.g., a rechargeable battery and/or a fuel tank. The present invention relates particularly to the daily trip planning in the area of mobility with electrically operated vehicles or vehicles for which the spatial density of energy-supply stations is low, as is presently the case, for example, for natural-gas-power vehicles or vehicles having a fuel-cell drive. In this context, the time needed to replenish the energy storage unit of the vehicle is also taken into account.

In the method of the present invention, a destination sequence for the travel route to be planned may be transmitted to an arithmetic logic unit. The arithmetic logic unit is coupled to a data memory in which data concerning a road network and data concerning geographical positions of parking facilities, which include parking lots or energy-supply stations, is stored for the vehicle. The arithmetic logic unit calculates a route sequence. In so doing, a projected amount of energy remaining in the energy storage unit for traveling over the route sequence is calculated. In addition, parking facilities assigned to the destinations and in the vicinity of the respective destination are ascertained in each case for the destinations in the destination sequence. An assigned parking facility is determined for each destination in the destination sequence, in doing which, the distance of the parking facility from the assigned destination, the geographical position of the next destination or the geographical positions of the parking facilities of the next destination and/or the projected amount of energy remaining in the energy storage unit for traveling the route sequence being taken into account in the determination. The route sequence is then put together from routes between parking facilities of successive destinations in the destination sequence. Finally, in the method, the calculated route sequence may be output or transmitted.

A destination sequence within the meaning of the present invention is understood to be a succession of geographical positions which are connected one after the other by the travel route to be planned. Correspondingly, a route sequence is understood to be a succession of routes which interconnects destinations or parking facilities assigned to the destinations.

In the method of the present invention, in determining the parking facilities which are assigned to a destination, the destination may thus be expanded into a destination space. This destination space includes the destination as well as the assigned parking facilities. For example, the size of this destination space may be a function of the maximum distance a parking facility is allowed to be from the destination. When the destination space has been determined, the parking facilities whose geographical positions lie within the destination space are ascertained. In the method of the present invention, not only the distance of the parking facility from the assigned destination is taken into consideration in selecting the parking facility, but also the next destination and possibly the previous destination in the route sequence and the projected amount of energy remaining in the energy storage unit. Therefore, in the method of the present invention, the travel route may be planned advantageously, taking various possible parking facilities for the vehicle upon reaching a destination in the destination sequence into account. In this manner, the route between the destinations in the destination sequence may be optimized. Furthermore, replenishing of the energy storage unit may be considered, since a selected parking facility may also include an energy-supply station. Therefore, planning for a travel route is able to be optimized for the predetermined destination sequence The arithmetic logic unit may decide automatically, as a function of the projected amount of energy remaining in the energy storage unit for traveling the route sequence, whether a parking lot or an energy-supply station is selected as parking facility. By the selection of the parking facility, it may thus advantageously be ensured that when traveling the route sequence, the vehicle at any time has sufficient energy reserves for powering the vehicle as well as possibly for internal loads of the vehicle. This is particularly important if the vehicle is an electric-powered vehicle having a relatively small traveling range.

The arithmetic logic unit may further decide automatically which parking facilities are selected, depending on the energy costs for replenishing the energy storage unit of the vehicle.

Appointment data, which includes geographical positions of at least a portion of the destinations of the travel route to be planned and associated time data, may be transmitted to the arithmetic logic unit. In this case, in determining the parking facilities, the arithmetic logic unit takes into account the projected amount of energy remaining in the energy storage unit for traveling the route sequence, the time data for the destination which is assigned to the parking facility, and the period of time for increasing the energy reserves in the energy storage unit by the energy-supply station.

Thus, from the appointment data, the arithmetic logic unit is able to ascertain the location information with respect to the destination sequence, as well as the times at which the vehicle must reach the destinations. Moreover, from the appointment data, the arithmetic logic unit is able to determine the length of stay of the vehicle at a destination. In particular, the travel route may be planned such that a parking facility is selected which includes an energy-supply station, the energy storage unit being replenished during the length of stay of the vehicle at a destination. In order to optimize the travel route, it may, however, be taken into account in the method that it is not absolutely necessary that the energy storage unit be replenished to its maximum at one energy-supply station. If an appointment has come to an end, the replenishing of the energy storage unit may be broken off, if necessary, before the energy storage unit is replenished to its maximum. Unnecessary delays for the user, caused by the replenishing of the energy storage unit, are thereby advantageously avoided. The downtime of the vehicle during an appointment of the user may be used optimally for replenishing the energy storage unit, without additional delays resulting for the user.

The arithmetic logic unit additionally may ascertain for the parking facilities, the distance from the assigned destination or the period of time a user needs to get from the parking facility to the assigned destination. In this case, the arithmetic logic unit may further take the ascertained period of time and the distance as well as the appointment data into account in determining the parking facilities. In so doing, in particular, it may also be considered whether the user will go by foot from the parking facility to the destination, or will get there in some other manner. In addition, a user-dependent walking speed may be taken into account.

In the method, the arithmetic logic unit in particular may optimize the route sequence in terms of the energy consumption in traveling the route sequence and/or in terms of the time for traveling the route sequence. It is further ensured that the destinations in the destination sequence are reached in accordance with the appointment data, in doing which, not only the time for reaching the parking facility assigned to a destination being considered, but also the subsequent period of time for reaching the destination.

The arithmetic logic unit furthermore may ascertain the availability likelihood of parking facilities. The availability likelihood is then taken into account in determining the parking facilities. If it is relatively unlikely that a parking facility will be available at the necessary time resulting from the route sequence, a different parking facility may be selected. In so doing, the availability likelihood of the parking facility may be set in relation to the worsening of the route sequence caused by the other parking facility. Advantageously, the travel-route planning may be further optimized in this manner. The availability likelihood of the parking facilities is ascertained in particular on the basis of the arrival time of the vehicle at the parking facility and the length of stay at the parking facility. For example, the arithmetic logic unit may also fall back upon historical data that indicates statistically at what times the individual parking facilities were occupied or were free in the past. In addition, reservations already made by third parties for the parking facilities may be considered in the availability likelihood.

Moreover, the driving behavior of a specific user may be predicted in calculating the route sequence. For example, for a specific driver, it may be ascertained from historical data, how fast or slowly he drives. From that, profiles may be derived for specific drivers.

The arithmetic logic unit may calculate the projected amount of energy remaining in the energy storage unit on the basis of the projected energy consumption in traveling the route sequence. In so doing, first of all, the projected energy consumption for powering the vehicle, and secondly, the projected energy consumption of internal loads of the vehicle are considered. This projected energy consumption is then taken into account in the projected amount of energy remaining in the energy storage unit during the traveling of the route sequence. In this manner, in the case of an electric-powered vehicle, it is advantageously taken into account that the energy consumption is also a function of the state of charge of the battery. Namely, if the state of charge of a battery is lower, a sharper change in the state of charge results when traveling a route than if the state of charge of the battery is higher. If the vehicle is powered by a fuel, in this case, allowance is made for the fact that because of the change in the weight of the vehicle, the fuel consumption is also a function of the remaining quantity of fuel in the vehicle.

Weather forecasts or the season in which the route sequence is to be covered may be considered in predicting the energy consumption of the internal loads of the vehicle. If it is revealed that the ambient temperature will probably be very high while traveling the route sequence, allowance may be made in predicting the energy consumption on the basis of internal loads that there is a high probability the air conditioner of the vehicle will be switched on while traveling the route sequence. In addition, characteristics of the road network of the route sequence, especially grades of the road and decelerations or accelerations because of curves, may be considered. These characteristics of the road network have an influence on the energy consumption when traveling the route sequence.

User-specific secondary conditions may be transmitted to the arithmetic logic unit. The arithmetic logic unit takes these user-specific secondary conditions into account when ascertaining the parking facilities. The user may indicate preferences as secondary conditions. For example, the user may indicate with what priority it should be ensured that a specific remaining amount of energy is always stored in the energy storage unit. This secondary condition is able to assure the user that, in the event of any unforeseen changes in the appointments, there is sufficient energy in the energy storage unit of the vehicle to be able to react to these changes. Furthermore, the user may indicate the priority for the appointments to be kept punctually. Alternatively, he may indicate a certain acceptable tardiness time. In this case, it may also be considered in planning the travel route that although the appointments in the route sequence cannot be honored exactly, the optimal route sequence is very much better than the next-best route sequence, so that slight tardiness is tolerated within the framework of the inputs by the user.

In addition, the user may indicate priorities with regard to the parking facilities. For example, the maximum distance of a parking facility from the destination may be set by him as a secondary condition. Furthermore, he may indicate a preference for a specific type of parking space, such as a parking space for the handicapped, for instance.

After a route sequence has been calculated using the method of the present invention, the calculated route sequence is output, e.g., with the aid of a display in conjunction with a geographical map. Furthermore, the parking facilities pertinent to the route sequence may be reserved automatically, by transmitting corresponding data to a corresponding device for reserving parking facilities. In addition, the calculated route sequence may be transmitted to a device of the vehicle.

While traveling the calculated route sequence, the amount of energy remaining in the energy storage unit of the vehicle may be sensed and compared to the projected remaining amount of energy of the vehicle for a corresponding route position. If the deviation of the sensed remaining amount of energy from the projected remaining amount of energy exceeds a limiting value, the route sequence is recalculated on the basis of the sensed remaining amount of energy. Thus, the method according to the present invention is used not only to plan a travel route prior to beginning the trip. Rather, it is also possible to check during the trip whether the predictions made when calculating the route sequence were accurate. In particular, the predictions concerning the energy consumption of the vehicle when traveling the route, i.e., the projected amount of energy remaining at the individual route positions, are compared to the actual remaining amount of energy. In response to deviations which exceed a specific limiting value, which may also be 0, the route sequence is recalculated. This calculation may be carried out in a manner corresponding to the calculation carried out to begin with. For instance, the limiting value may lie at a deviation of 5% or 10%.

Moreover, it may be checked whether, because of the deviation of the actual remaining amount of energy from the projected remaining amount of energy, one specific destination in the destination sequence can no longer be reached, since the energy for powering the vehicle is no longer sufficient for that. In such a case, the route sequence in particular may be altered such that the geographical position of an energy-supply station is inserted as an intermediate destination into the route sequence. It is thereby ensured advantageously that the destinations in the destination sequence are able to be reached in every case, even if they are reached at a later time, so that perhaps certain appointments will not be able to be honored timewise.

Furthermore, deviations from the actual values when driving the route sequence may also occur with regard to other assumptions which were made in the advance calculation of the route sequence. For instance, it may be checked whether specific positions in the route sequence will be reached in time, in agreement with the prediction timewise. In this context, data may also be considered which has been generated from another vehicle that is presently taking part in the traffic situation (what is termed XFCD—extended floating car data). In addition, data of a vehicle-to-vehicle or vehicle-to-X communication may also be considered. In the event of any deviations, the route sequence may be recalculated in this case, as well. Additionally, instantaneous traffic data may be taken into account. If this traffic data deviates from the assumptions in the advanced calculation of the route sequence, and if in terms of time or in terms of energy, perhaps certain destinations cannot be reached or cannot be reached in time, an adjusted route sequence may be calculated.

In addition, the availability likelihoods for parking facilities may also be updated during the trip by a wireless data transmission. In particular, the arithmetic logic unit may consider instantaneous data for the occupancy of the parking facilities, including the probable duration of the occupancy, and if necessary, adjust the route sequence such that parking facilities other than those in the route sequence calculated in advance are selected.

Finally, the route may also be re-planned continuously, and not as a function of specific events during the trip.

A device may further be provided for planning a travel route for a vehicle. The vehicle includes an energy storage unit for storing the energy to power the vehicle. The device includes an arithmetic logic unit and a data memory, coupled to the arithmetic logic unit, in which data concerning a road network and data concerning geographical positions of parking facilities, which include parking lots or energy-supply stations, is stored for the vehicle. The device further includes an interface, coupled to the arithmetic logic unit, via which a destination sequence for the travel route to be planned is transmittable to the arithmetic logic unit. Optionally, an output unit, coupled to the arithmetic logic unit, may also be provided, by which a route sequence, calculated by the arithmetic logic unit, is able to be output, in particular, is able to be displayed. Alternatively or additionally, an interface may also be provided for transmitting the data with respect to the calculated route sequence. In the case of the device of the present invention, a route sequence is able to be calculated by the arithmetic logic unit, the projected amount of energy remaining in the energy storage unit for traveling the route sequence being calculated. Parking facilities, assigned to the destinations, in the vicinity of the respective destination are ascertained in each case for the destinations in the destination sequence. An assigned parking facility is determined for each destination in the destination sequence, in doing which, the distance of the parking facility from the assigned destination, the geographical position of the next destination or the geographical positions of the parking facilities of the next destination and/or the projected amount of energy remaining in the energy storage unit for traveling the route sequence being taken into account in the determination. The route sequence is then put together from routes between parking facilities of successive destinations in the destination sequence.

The device of the present invention may be suitable for carrying out the method of the present invention described above. It therefore also may have the same advantages as the method of the present invention.

The device may include a vehicle-external module and a vehicle-internal module, the vehicle-external module including the arithmetic logic unit. The vehicle-external module and the vehicle-internal module are coupled to each other at least intermittently from the standpoint of data communication via an interface, so that at least the route sequence is transmittable from the vehicle-external module to the vehicle-internal module. The vehicle-internal module includes a further arithmetic logic unit, a further output unit, a memory for storing a route sequence transmitted by the vehicle-external module and a sensor for sensing the amount of energy remaining in the energy storage unit of the vehicle. While traveling the calculated route sequence, the sensed amount of energy remaining in the energy storage unit of the vehicle is able to be compared by the further arithmetic logic unit to the projected remaining amount of energy of the vehicle for a corresponding route position of the route sequence stored in the memory. If the deviation of the sensed remaining amount of energy from the projected remaining amount of energy exceeds a limiting value, the route sequence is able to be recalculated on the basis of the sensed remaining amount of energy and may be output via the output unit. During the trip, it is thus advantageously possible to adjust the route sequence calculated in advance, if the actual amount of energy remaining in the energy storage unit of the vehicle deviates from the projected remaining amount of energy of the vehicle. Furthermore, in the event of deviations of other parameters which were used in the pre-calculation of the route sequence, adjustments of the route sequence may also be made by the further arithmetic logic unit in the vehicle, as was explained above with reference to the method of the present invention.

The travel-route planning, that is, especially the calculation, planning and optimization of the travel route, may be carried out by a vehicle-external device, a vehicle-internal device, or split between a vehicle-external and a vehicle-internal device.

A method may be provided for planning a travel route for a vehicle, in which appointment data, which includes geographical positions of destinations of the travel route to be planned and associated time data, is transmitted to an arithmetic logic unit that is coupled to a data memory in which data concerning a road network for the vehicle and data concerning the geographical positions of energy-supply stations is stored. In the method, the arithmetic logic unit checks whether a route sequence is able to be calculated which connects the geographical positions of the destinations pertinent to the appointment data such that the destinations are reached at the associated times in the appointment data, in doing which, the projected amount of energy remaining in the energy storage unit of the vehicle for traveling the route sequence being determined and taken into account. If no such route sequence is able to be calculated by the arithmetic logic unit, the arithmetic logic unit determines adjusted appointment data for which such a route sequence is able to be calculated. The adjusted appointment data is then output.

Therefore, in the method of the present invention, it may not only be considered whether the energy reserves of the vehicle are sufficient to reach the destinations in the destination sequence. It may also be checked whether the appointments are able to be kept from the standpoint of time with a calculated route sequence. If this is not the case, in the method of the present invention, a change of the appointment data may be determined, for which there is a route sequence that causes no conflict with respect to the appointment data in terms of time. At the same time, however, the projected amount of energy remaining in the energy storage unit of the vehicle is also considered, in order to ensure that the destinations are able to be reached from the standpoint of energy. In predicting the remaining amount of energy, it is also taken into account that the amount of energy stored in the energy storage unit of the vehicle may be increased at the geographical positions of the energy-supply stations, in this context, it also not being necessary to completely replenish the energy storage unit of the vehicle at every energy-supply station.

In checking whether a route sequence is able to be calculated that causes no conflict for the appointment data, in particular, the arithmetic logic unit may try out various possible alternatives and check them as to whether the secondary conditions are satisfied in terms of geography, time and energy.

In checking whether the destinations are able to be reached at the corresponding starting times of the appointments, a period of time for reaching the destination when traveling the route sequence is calculated. Various factors may have some influence in this calculation of the route duration. For example, the route duration may be a function of the time of the day, the day of the week, possible holidays and/or the anticipated volume of traffic. Furthermore, stored historical data may be accessed to permit a more precise calculation of the route duration for traveling during a specific time of the day.

In the case of the adjusted appointment data, new time data may be assigned to geographical positions of destinations. Thus, each destination of the appointment data is still approached from the route sequence, however at different times. Advantageously, a travel-route planning may thereby be provided in which the user is able to keep the intended appointments, albeit delayed. The user is able to find out easily through the travel-route planning, the times to which the appointments should be delayed. After the appointments have been delayed, a route sequence is available which ensures that the destinations are able to be reached from the standpoint of time and energy.

If it is not possible to find a route sequence which connects the destinations to one another by a route sequence, even with altered time data, in the method of the present invention, it may also be proposed that one or more destinations be deleted or shifted, or that the order of the destinations be changed. The adjustment of his appointments is thereby also made easier for the user, since it is calculated, for example, which destination must be deleted or shifted in order to obtain a route sequence which interconnects the remaining destinations without conflict in terms of time or energy. The time data may also be altered interactively with the user.

In the method according to the present invention, the arithmetic logic unit, particularly when calculating the route sequence, may optimize the time usable for the user of the vehicle. For instance, this usable time may be increased by increasing the amount of energy in the energy storage unit of the vehicle during a downtime of the vehicle while the user is at an appointment. If it is necessary from the standpoint of energy, the arithmetic logic unit selects for the route sequence, the position of an energy-supply station in the vicinity of a destination, particularly at a parking facility of the destination, so that the energy storage unit of the vehicle may be charged during the downtime of the vehicle, during an appointment.

A device is further proposed for planning a travel route for a vehicle, which may include an energy storage unit for storing the energy to power the vehicle, the device having an arithmetic logic unit and a data memory, coupled to the arithmetic logic unit, in which data concerning a road network and data concerning geographical positions of energy-supply stations for the vehicle is stored. In addition, an interface is provided which is coupled to the arithmetic logic unit and via which appointment data, that includes geographical positions of destinations of the travel route to be planned and associated time data, is transmittable to the arithmetic logic unit. The device also includes an output unit, coupled to the arithmetic logic unit, by which a route sequence calculated by the arithmetic logic unit and/or adjusted appointment data are able to be output. The device of the present invention may be characterized in that with the aid of the arithmetic logic unit, it may be checked whether a route sequence is able to be calculated that connects the geographical positions of the destinations pertinent to the appointment data such that the destinations are reached at the associated times in the appointment data, in doing which, the projected amount of energy remaining in the energy storage unit of the vehicle for traveling the route sequence being determined and taken into account. If no such route sequence is able to be calculated, adjusted appointment data is determinable by the arithmetic logic unit for which such a route sequence is able to be calculated.

The device of the present invention may be suitable for carrying out the method of the present invention. It therefore also may have the same advantages as the method according to the present invention.

The device may include a vehicle-external module and a vehicle-internal module, the vehicle-external module including the arithmetic logic unit. The vehicle-external module and the vehicle-internal module are coupled to each other at least intermittently from the standpoint of data communication via an interface, so that at least a route sequence is transmittable from the vehicle-external module to the vehicle-internal module. The vehicle-internal module includes a further arithmetic logic unit, a further output unit, a memory for storing a route sequence transmitted by the vehicle-external module and a sensor for sensing the amount of energy remaining in the energy storage unit of the vehicle. While traveling the calculated route sequence, the sensed amount of energy remaining in the energy storage unit of the vehicle is able to be compared by the further arithmetic logic unit to the projected remaining amount of energy of the vehicle for a corresponding route position of the route sequence stored in the memory. If the deviation of the sensed remaining amount of energy from the projected remaining amount of energy exceeds a limiting value, with the aid of the further arithmetic logic unit, it may be checked whether the destinations of the route sequence will still be reached at the associated times in the appointment data, in doing which, the projected amount of energy remaining in the energy storage unit of the vehicle for traveling the route sequence being determined. If the check reveals that the destinations of the route sequence cannot be reached at the associated times, the further arithmetic logic unit calculates an adjusted route sequence or specific adjusted appointment data for output via the further output unit.

The aforesaid features of the methods and devices of the present invention may be combined individually or together in any combination.

A method may be provided for planning a travel route for a vehicle, in which a destination sequence for the travel route to be planned is transmitted to an arithmetic logic unit that is coupled to a data memory in which data concerning a road network for the vehicle is stored. The arithmetic logic unit subsequently calculates a route sequence which connects the destinations in the destination sequence. Furthermore, a projected amount of energy remaining in the energy storage unit for traveling the route sequence is calculated. In addition, at least for the geographical position of the vehicle at one specific destination of the destinations in the destination sequence, on the basis of the projected amount of energy remaining in the energy storage unit of the vehicle and on the basis of the stored road network and a projected energy consumption in traveling the road network, the points in the road network which are still reachable from the one specific destination with the projected remaining amount of energy at this specific destination are ascertained. For at least the specific destination in the destination sequence, a graphic map depiction is generated in which the geographical position of this destination and the points in the road network which are still reachable from this destination with the projected remaining amount of energy of the vehicle at this destination are visually represented.

Thus, a visual representation of the remaining traveling range with respect to a route sequence calculated in advance may be generated by the method of the present invention. In particular, for each destination in the destination sequence on a geographical map, an area is identified which is able to be reached from this destination with the amount of energy remaining in the energy storage unit of the vehicle. Owing to this visual representation, already during the planning of the route sequence, i.e., before the start of the trip, for each destination an impression is conveyed to the user as to which areas he is still able to reach with the actual energy reserves of the vehicle. In particular, this representation obviates uncertainty on the part of a user concerning the use of electric-powered vehicles. In addition, with the aid of this visual representation, the user can also easily and intuitively influence the route planning.

For example, the visual representation may be accomplished by demarcating an area on the graphic map depiction, the demarcated area containing the reachable points in the road network. The visual representation may also be accomplished by a closed contour. In addition, data concerning geographical positions of energy-supply stations for the vehicle may be stored in the data memory. The geographical positions of energy-supply stations which are still reachable from the specific destination with the projected remaining amount of energy of the vehicle are visually represented in the graphic map depiction. Advantageously, the user in this manner is able to learn easily and intuitively whether energy-supply stations may be reached from a specific destination when traveling the route sequence, so that the energy storage unit of the vehicle may be replenished again at any time.

The route sequence may include the geographical position of an energy-supply station as an intermediate destination or as parking facility. For this intermediate destination, a graphic map depiction is generated in which the geographical position of this intermediate destination and the points in the road network which are still reachable prior to replenishing the energy storage unit at the energy-supply station are visually represented, and furthermore, the points in the road network which are reachable after replenishing the energy storage unit at the energy-supply station are visually represented. In this manner, the user may be informed as to what the remaining traveling range looks like prior to replenishing the energy storage unit and after replenishing the energy storage unit.

A reference position may be determined. In calculating the route sequence, it is ensured that the reference position always lies within the remaining traveling range of the vehicle. For example, the reference position may be the residence or the workplace of the user. In calculating the route sequence, it is thus advantageously ensured that at any time while traveling the route sequence, the user is able to get back to this reference position. In this context, the reference position also lies within the remaining traveling range of the vehicle if, in order to reach the reference position, the vehicle must stop at an energy-supply station for the vehicle as intermediate destination. Namely, in this case, as well, it is ensured that the reference position is reachable from the standpoint of energy.

While traveling over the calculated route sequence, the amount of energy remaining in the energy storage unit of the vehicle may be sensed, and at least upon reaching one destination in the destination sequence, an adjusted graphic map depiction is generated in which the geographical position of this destination and the points in the road network able to be reached from this destination with the sensed amount of energy remaining in the energy storage unit of the vehicle are visually represented. In this manner, the remaining amount of energy which was taken as a basis in the precalculation of the route sequence, is checked in light of the remaining amount of energy actually measured in the vehicle. In the event of any deviations, an adjusted map depiction having the visual representation of the remaining traveling range is displayed to the user, so that the user is able to discern easily and intuitively whether the further destinations in the destination sequence still lie within the remaining travel range. If this is not the case, the user or the arithmetic logic unit may make automatic adjustments to the route sequence, as was already explained with respect to the other aspects of the present invention.

A device may further be provided for planning a travel route for a vehicle, which includes an energy storage unit for storing the energy to power the vehicle. The device has an arithmetic logic unit and a data memory, coupled to the arithmetic logic unit, in which data concerning a road network for the vehicle is stored. The device also has an interface, coupled to the arithmetic logic unit, via which a destination sequence for the travel route to be planned is transmittable to the arithmetic logic unit. In addition, an output unit is coupled to the arithmetic logic unit. In the case of the device of the present invention, a projected amount of energy remaining in the energy storage unit for traveling the route sequence is able to be calculated by the arithmetic logic unit. At least for the geographical position of the vehicle at one specific destination of the destinations in the destination sequence, on the basis of the projected amount of energy remaining in the energy storage unit of the vehicle and on the basis of the stored road network and a predicted energy consumption in traveling the road network, the points in the road network which are still reachable from the one specific destination with the projected remaining amount of energy at this specific destination are ascertainable. For at least the specific destination in the destination sequence, a graphic map depiction is able to be generated and able to be output by the output unit, in which the geographical position of this destination and the points in the road network which are still reachable from this destination with the projected remaining amount of energy of the vehicle at this destination are visually represented.

The device may be designed to carry out the method according to the present invention. Therefore, the device may also have the same advantages as the method according to the present invention.

The device may have a vehicle-external module and a vehicle-internal module, the vehicle-external module including the arithmetic logic unit. The vehicle-external module and the vehicle-internal module are coupled to each other at least intermittently from the standpoint of data communication via an interface, so that at least the route sequence is transmittable from the vehicle-external module to the vehicle-internal module. The vehicle-internal module includes a further arithmetic logic unit, a further output unit, a memory for storing a route sequence transmitted by the vehicle-external module to the vehicle-internal module, and a sensor for sensing the amount of energy remaining in the energy storage unit of the vehicle. While traveling the calculated route sequence, the sensed amount of energy remaining in the energy storage unit of the vehicle is able to be compared by the further arithmetic logic unit to the projected remaining amount of energy of the vehicle for a corresponding route sequence of the route sequence stored in the memory. If the deviation of the sensed remaining amount of energy from the projected remaining amount of energy exceeds a limiting value, an adjusted graphic map depiction is generated in which the geographical position of one destination and the points in the road network able to be reached from this destination with the sensed amount of fuel remaining in the energy storage unit of the vehicle are visually represented. In this manner, the visual representation of the remaining traveling range of the vehicle upon reaching one destination is adjusted advantageously as a function of the actual remaining amount of energy in the vehicle.

The features of the methods and devices according to the present invention may be used individually or in combination in any combination.

Exemplary embodiments of the present invention are described in the following with reference to the accompanying drawings.

DETAILED DESCRIPTION

Figure 1:
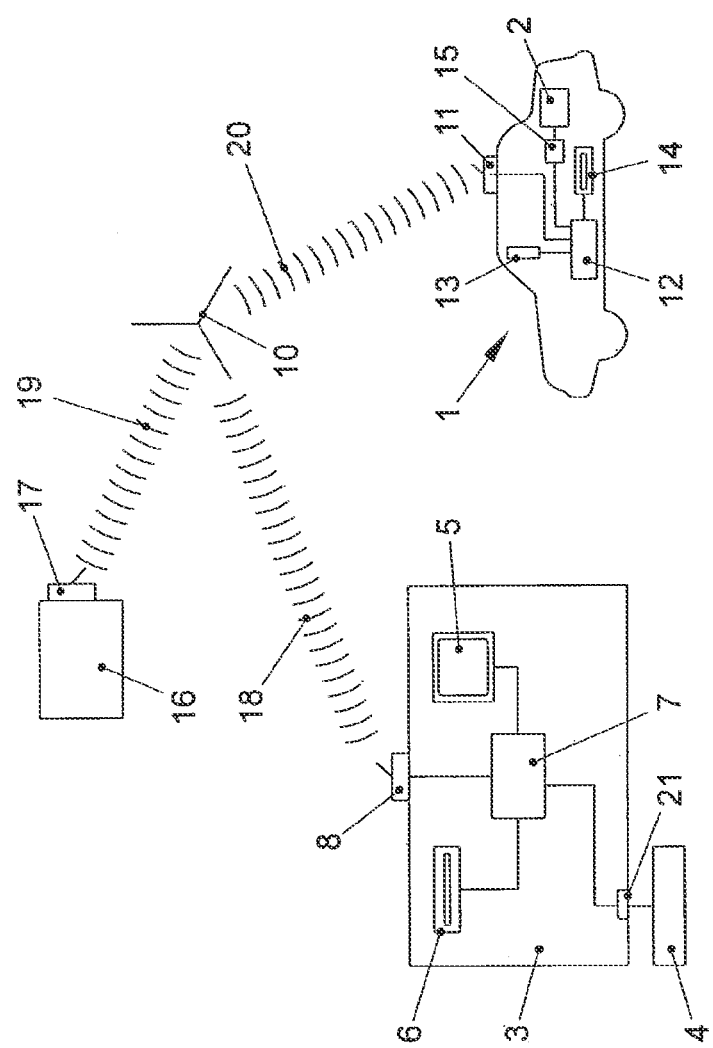
FIG. 1 shows schematically an exemplary embodiment of the device according to the present invention for planning a travel route for a vehicle.

The basic design of an exemplary embodiment of the device according to the present invention is shown schematically in FIG. 1. The device includes a vehicle-internal module and a vehicle-external module, which are able to exchange data with each other, at least intermittently.

The vehicle-external module may include a computer 3, which is connected to an input unit 4 via an interface 21. Input unit 4 may be a keyboard or a mobile device, via which data may be input into computer 3. Computer 3 further includes an arithmetic logic unit 7 which is coupled to a data memory 6 and a display device 5, as well is to interface 21. With the aid of computer 3, a travel route is able to be planned for a vehicle 1, as explained later with reference to an exemplary embodiment of the method according to the present invention.

The vehicle-internal module is accommodated in a vehicle 1. Vehicle 1 includes an energy storage unit 2. Energy storage unit 2 may take the form of a rechargeable battery. This battery supplies the energy for powering vehicle 1 and possibly for further internal loads of vehicle 1. However, energy storage unit 2 may also be a fuel tank which holds fuel for powering vehicle 1. In addition, it is possible that vehicle 1 is a hybrid vehicle, which may be powered both by the energy of a battery and by a fuel.

With energy storage unit 2, a sensor 15 is provided for sensing the amount of energy remaining in energy storage unit 2. This sensor senses the state of charge of a rechargeable battery or the level of fuel in a fuel tank.

In addition, vehicle 1 includes a further arithmetic logic unit 12 which is coupled, in terms of data communication, to sensor 15, a further display device 13 and a further data memory 14.

Computer 3 and vehicle 1 are further equipped with radio interfaces 8 and 11 which are connected to arithmetic logic unit 7 and arithmetic logic unit 12, respectively. In this manner, between interfaces 8 and 11, a data transmission 18, 20 may be produced between computer 3 and vehicle 1 via a switching station 10. Thus, in particular, data may be transmitted from computer 3 to arithmetic logic unit 12 of vehicle 1. For example, the radio link may be a mobile radio link. However, it would also be possible if it were a wireless network connection (WLAN) or other short-range radio link which permits an exchange of data when vehicle 1 is in the vicinity of computer 3. If the network involves a mobile radio link, it is further possible that computer 3 and arithmetic logic unit 12 of vehicle 1 exchange data with an external server 16 that also has a radio interface 17. Server 16 permits a data transfer 19 which includes relevant information for the route planning, as explained later with reference to the exemplary embodiment of the method according to the present invention.

Figure 2:
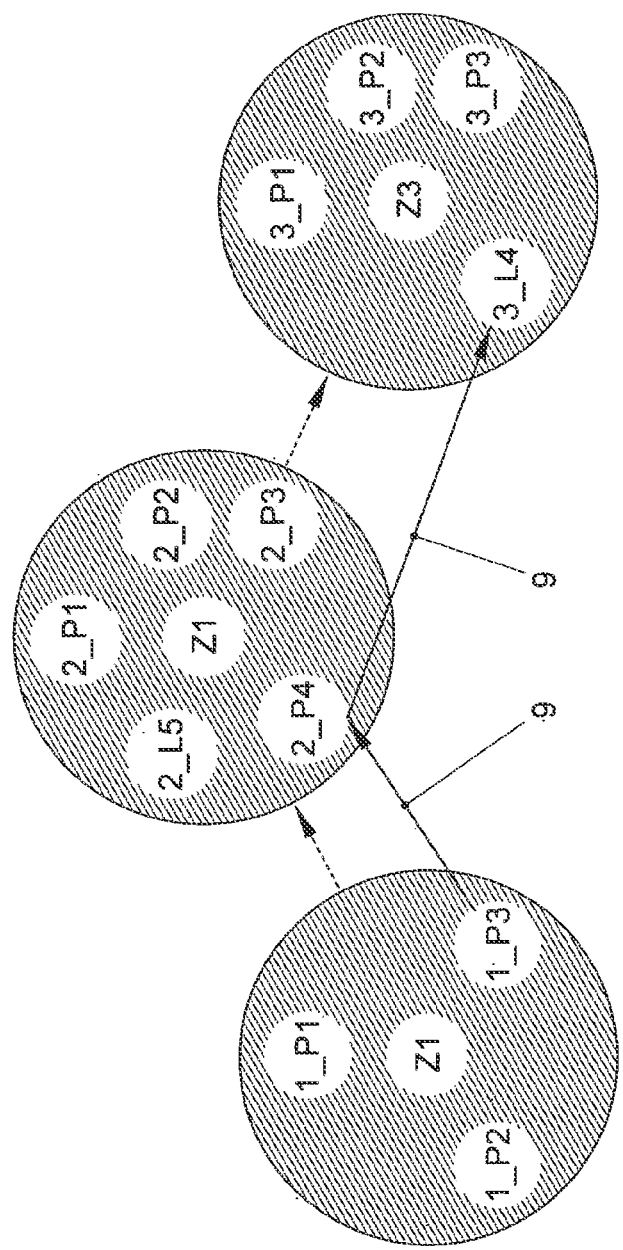
FIG. 2 shows a representation to illustrate the destinations as well as the parking facilities assigned to the destinations.

An example for a route to be planned is illustrated schematically in FIG. 2. Via an electronic appointment calendar, a schedule for one day of the user was transmitted by way of interface 21 to arithmetic logic unit 7. On this day, the user wants to stop at destinations Z1, Z2 and Z3. Different geographical positions are assigned to these destinations Z1, Z2 and Z3. In addition, the appointment data includes time data which indicates when the user wants to reach destinations Z1, Z2 and Z3, and when he wants to leave them again. The route to be planned should therefore interconnect destination sequence Z1, Z2 and Z3 such that the user is able to keep the appointments at these destinations Z1, Z2, Z3 at the assigned times. At the same time, it should also be ensured that the energy reserves in energy storage unit 2 of vehicle 1 are sufficient to stop at destinations Z1, Z2 and Z3. In this context, however, it is also possible that energy storage unit 2 will be replenished at energy-supply stations while traveling the route sequence.

In addition, it is taken into account that the user cannot stop directly at destinations Z1, Z2 and Z3 with his vehicle 1, but rather needs a parking facility for vehicle 1. Therefore, data memory 6 contains a list with parking facilities, their geographical positions, as well as information as to whether the parking facility is a parking lot or whether the parking facility includes an energy-supply station, by which energy storage unit 2 of vehicle 1 may be replenished.

In the case of destinations Z1, Z2 and Z3 illustrated in FIG. 2, parking lots 1_P1, 1_P2, 1_P3 are assigned to destination Z1. Parking lots 2_P1, 2_P2, 2_P3 and 2_P4, as well as energy-supply station 2_L5, are assigned to destination Z2. Parking lots 3_P1, 3_P2, 3_P3 and energy-supply station 3_L4 are assigned to third destination Z3. With the aid of arithmetic logic unit 7, a route sequence may be determined which interconnects the parking facilities assigned to destinations Z1, Z2 and Z3, as shown by arrows 9.

Figure 3:
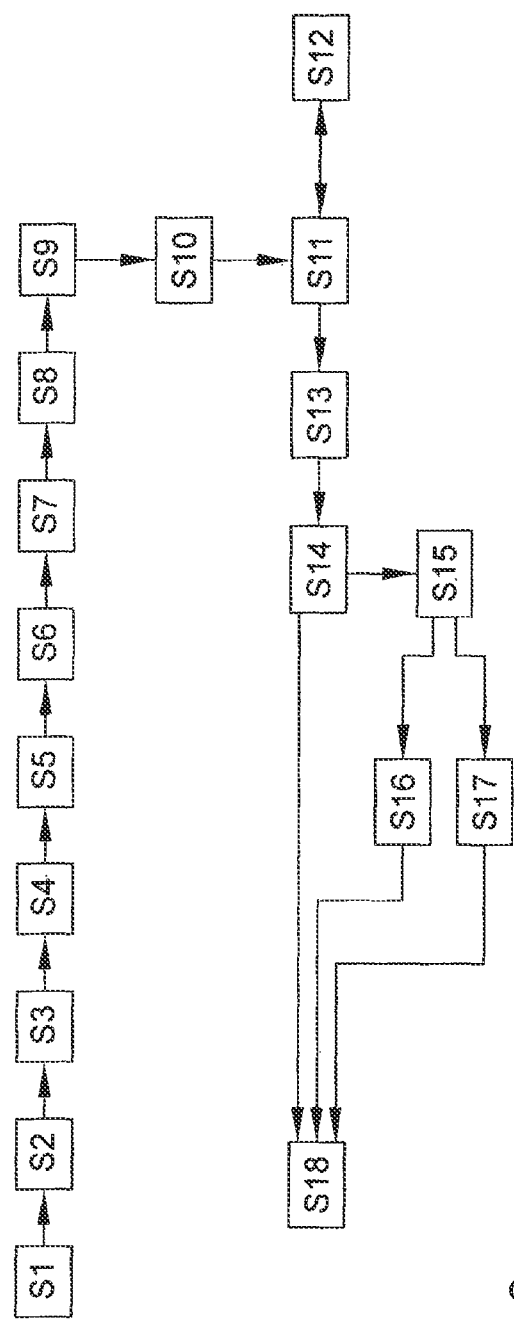
FIG. 3 shows an exemplary embodiment of the method according to the present invention for planning a travel route for a vehicle.

An example of such a method for planning a travel route is explained in the following with reference to FIG. 3:

First of all, in step S1, user-specific secondary conditions are transmitted via interface 21 to arithmetic logic unit 7 of computer 3. These secondary conditions may specify preferences of the user. For example, these preferences may relate to the parking facilities for the destinations. The user may specify a maximum distance of a parking facility from a destination. Moreover, he may indicate a certain preference for a type of parking space, for example, a parking space for the handicapped. Furthermore, the user may indicate with what priority it should be ensured that a certain remaining amount of energy is always stored in energy storage unit 2 of vehicle 1 during the planned route sequence. The user may further indicate how important it is to him that he arrive at the destinations punctually at the start times of the appointments. In some instances, he may indicate a certain tolerance for tardiness here. For example, the user may indicate that a destination is allowed to be reached 5 minutes late if this prevents the necessity of selecting an energy-supply station between two destinations, instead of replenishing energy storage unit 2 in a parking facility at a destination during an appointment.

In step S2, the appointment data of the user is subsequently transmitted, e.g., from an electronic calendar on a mobile terminal of the user with the aid of interface 21 to arithmetic logic unit 7. The appointment data contains information regarding the geographical positions of destinations of the travel route to be planned as well as associated time data. The time data indicates when an appointment at a specific destination begins and when it ends. Thus, the length of stay at a specific destination may also be ascertained from this data.

In step S3, arithmetic logic unit 7 splits the appointment data into a destination sequence having successive destinations. After that, a travel route is calculated, having routes which connect the destinations in the destination sequence to one another. In so doing, arithmetic logic unit 7 accesses a road network which vehicle 1 can use, that is stored in data memory 6. In step S4, various routes are determined for this, which connect successive destinations in the destination sequence to one another. For each route, in step S5, the traffic in traveling the route is then estimated. In so doing, arithmetic logic unit 7 may fall back upon historical traffic data, which is stored in data memory 6. In addition, traffic data may be transmitted by external server 16 via radio links 19 and 18 to arithmetic logic unit 7. Furthermore, traffic data may also be considered which has been generated from another vehicle that is presently taking part in the traffic situation (what is termed XFCD—extended floating car data). In addition, traffic data may also be considered which has been transmitted by a vehicle-to-vehicle or vehicle-to-X communication. In this manner, arithmetic logic unit 7 is able to estimate the volume of traffic in traveling a route.

Furthermore, in step S6, arithmetic logic unit 7 may estimate the velocity of vehicle 1 in driving a route. In this estimation, the arithmetic logic unit may consider the type of road driven, which is stored together with the road network in data memory 6. Furthermore, arithmetic logic unit 7 may allow for user-specific data concerning the driving behavior of the driver who is to travel the route sequence. Such driver-specific data may also be stored in data memory 6. For instance, it may be acquired from previous trips of this driver.

In step S7, from the lengths of the different routes which connect the destinations, the estimation of the traffic in driving the route and the driver-specific data, a rough estimation is made as to how much time the driver will need to travel the individual routes. Alternative route sequences which require as little time as possible to reach the destinations are then ascertained.

In step S8, arithmetic logic unit 7 now projects the amount of energy remaining in energy storage unit 2 for traveling the route sequences. In so doing, the energy consumption of vehicle 1 and characteristics of the road network in traveling the route sequences are considered. For instance, the type of gradient of a road in the road network may be considered, since the gradient has an effect on the energy consumption of vehicle 1. Furthermore, decelerations and accelerations because of curves may be taken into account, since they also have an effect on the energy consumption of vehicle 1. In addition, in an iterative process, the projected amount of energy remaining in the energy storage unit is considered. Namely, the state of charge of a rechargeable battery or the amount of fuel in a tank of vehicle 1 influences the energy consumption of the vehicle. That is to say, if the state of charge of a battery is lower, a sharper change in the state of charge results when traveling a route than if the state of charge of the battery is higher. Furthermore, allowance is made for internal loads of vehicle 1 in the projected energy consumption. For example, it is possible to determine the probability that the air conditioner will be switched on while traveling the route. User behavior of the driver of vehicle 1 may also be taken into account. The data from which the energy consumption and therefore the amount of energy remaining in energy storage unit 2 for traveling the route sequences are predicted, is stored in data memory 6. It is able to be read out by arithmetic logic unit 7 and considered accordingly in the prediction.

In step S9, arithmetic logic unit 7 selects preferred route sequences. In so doing, it is especially considered whether the respective remaining amount of energy at the geographical positions of the route sequences is sufficient to reach the destinations in the destination sequence. If not all the destinations can be reached with the initial amount of energy in energy storage unit 2 of vehicle 1, it is necessary that energy storage unit 2 be replenished while traveling the route sequence. The geographical positions of energy-supply stations are stored in data memory 6 for that purpose. Arithmetic logic unit 7 preferably selects those route sequences in which energy storage unit 2 of vehicle 1 is able to be replenished while vehicle 1 is at a parking facility, which is assigned to one destination in the destination sequence, during an appointment of the user.

For the selection of the parking facility, in step S10, a destination space is formed for the destinations in the destination sequence. The size of the destination space is a function of the maximum distance a parking facility is allowed to be from the destination. This maximum distance may have been input by the user in step S1. The geographical positions of all parking facilities of the road network are stored in data memory 6. The parking facilities which lie within the destination space that belongs to a specific destination may now be ascertained. Whether the parking facility is a parking lot or whether the parking facility includes an energy-supply station (see FIG. 2) is also stored in data memory 6.

In step S11, an assigned parking facility is determined for each destination in the destination sequence. In so doing, the following factors are considered:

From the projection for the amount of energy remaining in energy storage unit 2 of vehicle 1, it is determined whether it is necessary that the parking facility include an energy-supply station. If this is the case, only parking facilities having energy-supply stations are considered in the following selection. If this is not the case, only parking lots are considered.

In addition, the distance of the parking facility from the assigned destination is considered, as well as possibly the period of time the user needs to get from the parking facility to the destination. In so doing, it may also be considered whether the user is walking from the parking facility to the destination, or will get from the parking facility to the destination in some other manner. From the distance and the manner of reaching the destination from the parking facility, it is possible to infer the period of time needed for a user to get from the parking facility to the assigned destination. In so doing, user-dependent walking speeds may also be considered, which are stored in data memory 6.

In addition, the geographical position of the next destination or the geographical position of the parking facilities of the next destination or of one selected parking facility of the next destination is considered. Alternatively or additionally, the geographical position of the previous destination or the geographical position of the parking facilities of the previous destination or of one selected parking facility of the previous destination may be considered. This consideration may show that the parking facility nearest to a destination is not always the best. If, due to this parking facility, the route for reaching the destination and the next destination is lengthened, a different parking facility may be more favorable in terms of time, even though it is further away from the assigned destination.

The parking facilities assigned to the destinations are now selected by arithmetic logic unit 7 such that no conflicts result either in terms of time or in terms of energy. This means that in driving the route sequence, the energy reserves in the energy storage unit of vehicle 1 are sufficient to get to the parking facilities which are assigned to the destinations, it being taken into account that energy storage unit 2 is able to be replenished partially or completely at parking facilities having energy-supply stations. It is further ensured that the user reaches the destinations in time, i.e., in accordance with the appointment data, in this context, not only the time for driving the routes between the parking facilities being considered, but also the period of time a user needs to get from the parking facility to the assigned destination.

In addition, in step S12, the availability likelihood of the parking facilities in the destination space for the destinations may be ascertained. For this, in a step S11, the arrival time of the vehicle at the parking facility to be checked and the length of stay at this parking facility may be ascertained and compared to historical data stored in data memory 6. Moreover, via data connections 18 and 19, reservations already made by third parties for the parking facilities may be retrieved from external server 16. If reservations already exist for the desired time, the likelihood that the corresponding parking facility will be available is very low or zero. Such parking facilities are then not considered in step S11 by arithmetic logic unit 7 for the route sequence.

Subsequently, in step S13, detailed planning of the route sequence is carried out. In so doing, the routes between two parking facilities that belong to successive destinations in the destination sequence are optimized again in terms of time and energy.

Thereupon, in step S14, the routes in the day's routine are optimized, in doing which, it may be ensured that the route sequence fits in timewise with the required appointment data. It is ensured that the user will arrive at the corresponding geographical positions at the starting times of the appointments. In so doing, the usable time of the user is also optimized. In particular, this means that the amount of energy in energy storage unit 2 of vehicle 1 is increased during a downtime of vehicle 1, while the user is at an appointment. If arithmetic logic unit 7 was able to calculate a route sequence that causes no conflicts with the appointment data in terms of time and energy, in step S18, the calculated route sequence may be displayed via a display device 5 or output via radio interface 8. The details concerning the visual representation of the route sequence are explained later.

On the other hand, if it turns out that arithmetic logic unit 7 is unable to calculate any route sequence that causes no conflicts with the appointment data in terms of time, in step S15, various alternative route sequences are checked by arithmetic logic unit 7. In so doing, initially the secondary conditions with regard to energy and geography remain unchanged, that is, the intention is for the route sequence still to pass through the destination sequence corresponding to the appointment data. Furthermore, arithmetic logic unit 7 ensures that the projected amount of energy in energy storage unit 2 of vehicle 1 will be sufficient to reach all destinations in the destination sequence, in doing which, allowance being made for the fact that in the meantime, energy storage unit 2 is able to be replenished by energy-supply stations in the course of traveling the route sequence. In this context, a route sequence is calculated which gets as close as possible timewise to the desired appointment data.

In step S16, adjusted appointment data is then output, there being an assigned route sequence which produces no conflicts with the adjusted appointment data. The user is able to accept the adjusted appointment data with the aid of input unit 4. The appointment data is then transmitted via interface 21 to the electronic calendar. If desired, messages are generated automatically for further participants in the appointment, in order to inform them of the adjusted appointment data.

If it is not possible to calculate a route sequence which is based on adjusted appointment data and without conflicts in terms of time or energy, in step S17, a route sequence is calculated in which one or more destinations were deleted. These changes in the appointment data as well as the adjusted route sequence are output. If the user accepts the adjusted route sequence and the altered appointment data, the adjusted route sequence is stored as the effective route sequence, and the altered appointment data is transmitted to the electronic calendar of the user.

As soon as the route sequence for the travel-route planning is certain, in step S18, the calculated route sequence is displayed and output. In addition, the desired parking facilities for the route sequence are reserved by arithmetic logic unit 7 at external server 16 via data connections 18 and 19.

Various uncertainties which arise in planning the travel route may also be determined and coupled to each other. First of all, an uncertainty may be determined as to whether the driver will achieve the projected arrival time at a parking facility at a specific moment. Furthermore, allowance may be made for the probability that at the predicted departure time, the driver will also actually leave the parking facility. The probabilities may be represented with the aid of curves which indicate different heights, i.e., probabilities, and which have different widths, i.e., different deviations from the predicted value.

In addition, a probability of deviation from the nominal traffic flow may be considered. In combination with the uncertainty that the driver will reach a specific parking facility and leave it again at the projected time, probabilities may be calculated for arrival and departure times subject to traffic.

Furthermore, an uncertainty may be taken into account which relates to the occupancy of an energy-supply station or a parking place. In some instances, vehicle 1 must wait a certain time until the parking place or the energy-supply station becomes free. Thus, the probabilities for the arrival and departure times may be further modified.

The combinations of probability distributions may be used by arithmetic logic units 7 and 12 to optimize the advanced planning of the route sequence and to optimize the route sequence during the trip. In this context, the predictability and the ability of the travel route to be planned are maximized in the network.

Figure 4:
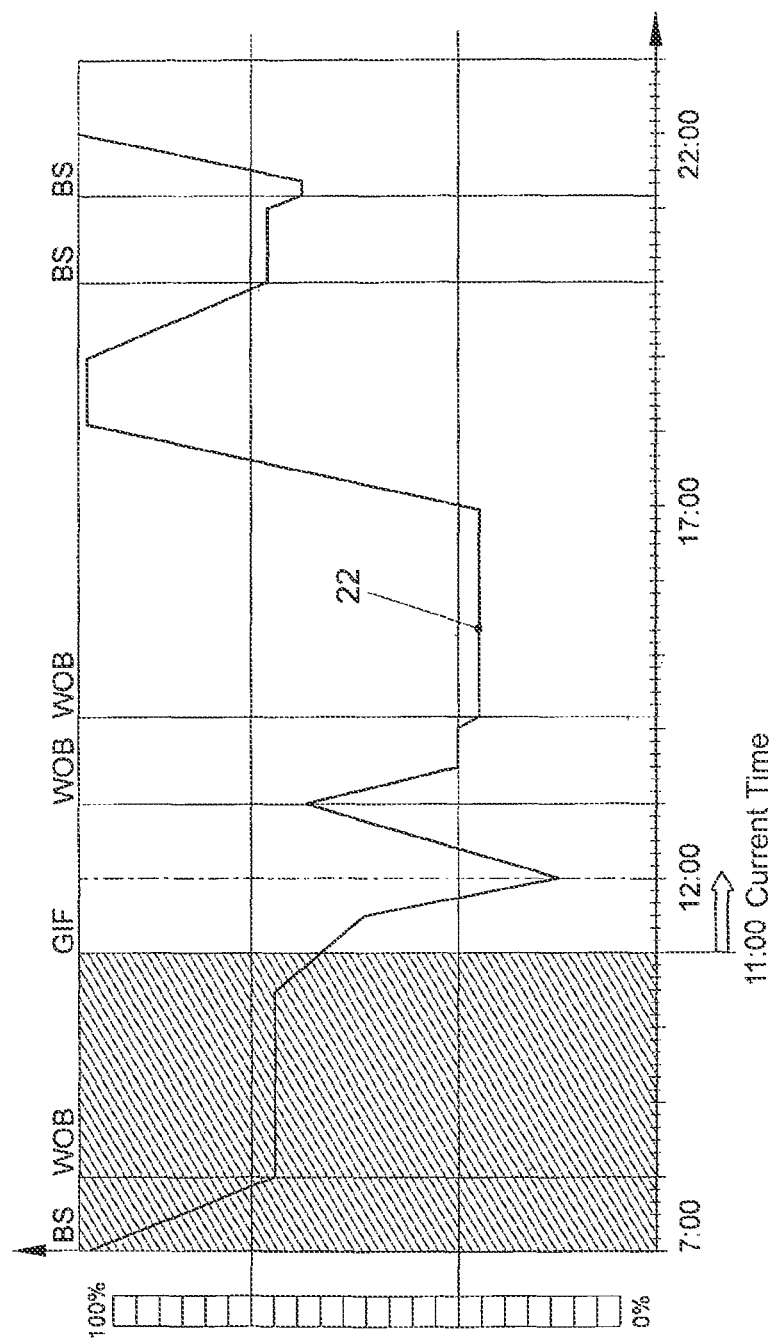
FIG. 4 shows a graphic representation having a curve which shows the remaining amount of energy in traveling the route sequence.

In the following, with reference to FIGS. 4 through 12, it is described how the travel-route planning, calculated using the method described above, is output:

In FIG. 4, the projected remaining amount of energy for the route sequence is illustrated, as it may be displayed to the user. A coordinate system is displayed, on whose horizontal axis the time is plotted, and on whose vertical axis the amount of energy remaining in energy storage unit 2 of the vehicle is plotted from 0% to 100%. In addition, on the horizontal axis, abbreviations are indicated for locations which are reached at the respective times in the route sequence. From curve 22 shown, it is clear, for example, that at 7:00 AM, the vehicle is traveling from Braunschweig (BS) in the direction of Wolfsburg (WOB). In Wolfsburg, a downtime of the vehicle is apparent. At 12:00, energy storage unit 2 of vehicle 1 is then replenished. At 5:00 PM and shortly before 10:00 PM, energy storage unit 2 is replenished again. In addition, it is obvious from curve 22 that if energy storage unit 2 had not been replenished at 12:00, the energy reserves would have been exhausted while traveling a route of the route sequence. Thus, a conflict in terms of energy would have resulted, which would have led to the driver having a breakdown with the vehicle.

Figure 5:
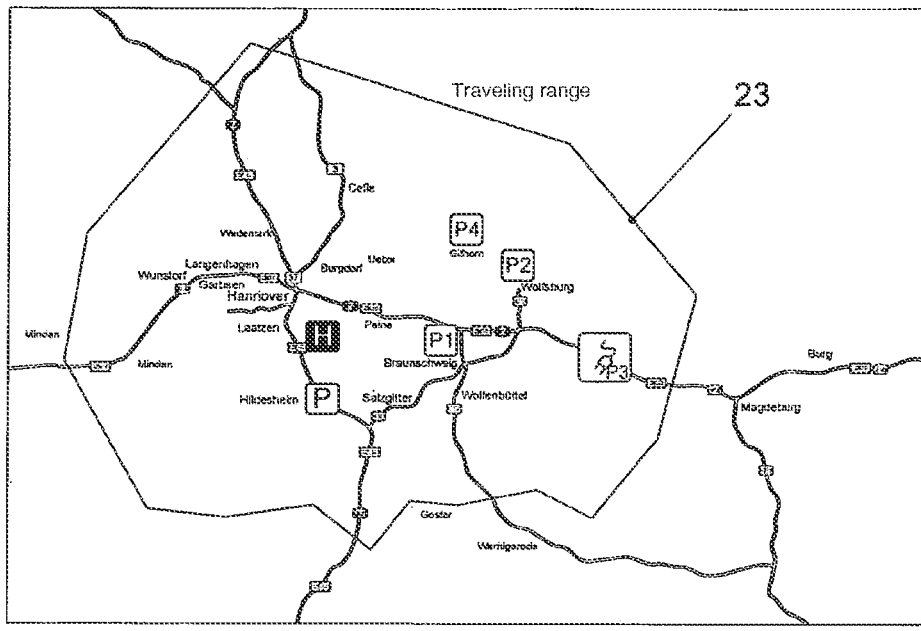
FIGS. 5 to 12 show graphic map depictions with additional information concerning the route sequence.

Moreover, as shown in FIG. 5, after the route sequence has been calculated with the aid of the road network stored in data memory 6, a graphic map depiction may be generated in which the geographical positions of the parking facilities pertinent to the destinations are represented by symbols P1 through P4. If the parking facility includes an energy-supply station, additionally, a symbol is shown which indicates that the battery of the electric-powered vehicle can be charged, for example. In addition, the geographical position of a reference position H is displayed. For instance, the reference position may be the residence of the user or his workplace.

If one assumes that the user starts the route sequence at reference position H, on the basis of the initial amount of energy in energy storage unit 2 of the vehicle and on the basis of the stored road network, it is determined which points in the road network are still reachable from reference position H. Given this traveling range, the projected energy consumption in driving the road network is also taken into account. A boundary line 23, which visually represents the traveling range of vehicle 2 in the case of geographical reference position H, is now shown in the graphic map depiction. Boundary line 23 demarcates the area having the points in the road network which are reachable from the position of vehicle 2 with the amount of energy remaining in energy storage unit 2.

Figure 6:
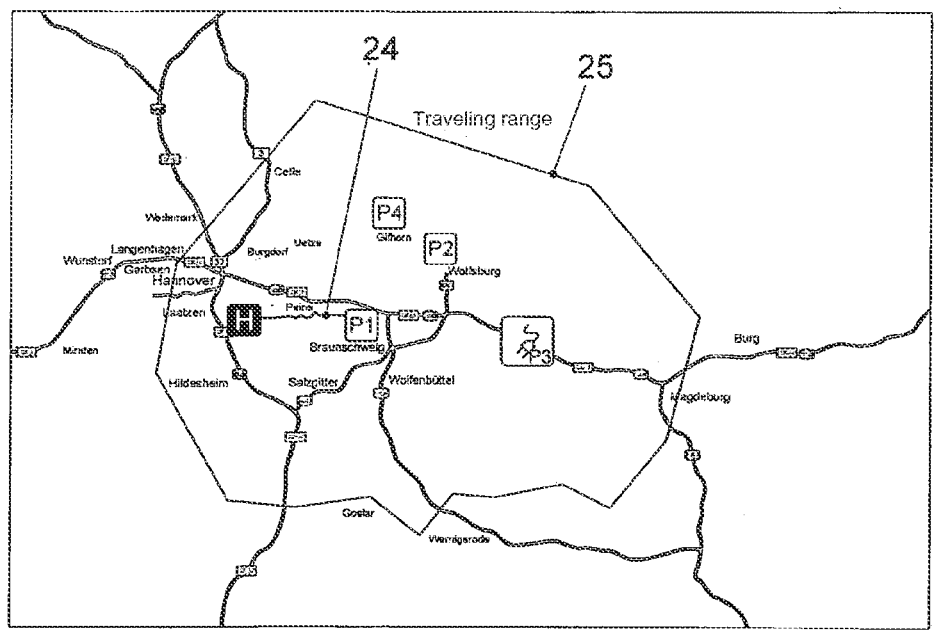

In a further representation shown in FIG. 6, first of all, route 24 from geographical reference position H to parking facility P1, which is assigned to the first destination, is shown. Furthermore, the amount of energy remaining in energy storage unit 2 of vehicle 1 at the geographical position of parking facility P1 is projected, as described above. The traveling range of vehicle 1 is determined again for this remaining amount of energy, that is, the points in the road network which are still reachable from parking facility P1 with the projected remaining amount of energy are ascertained. A boundary line 25 is again displayed on the graphic map depiction for this traveling-range area.

Figure 7:
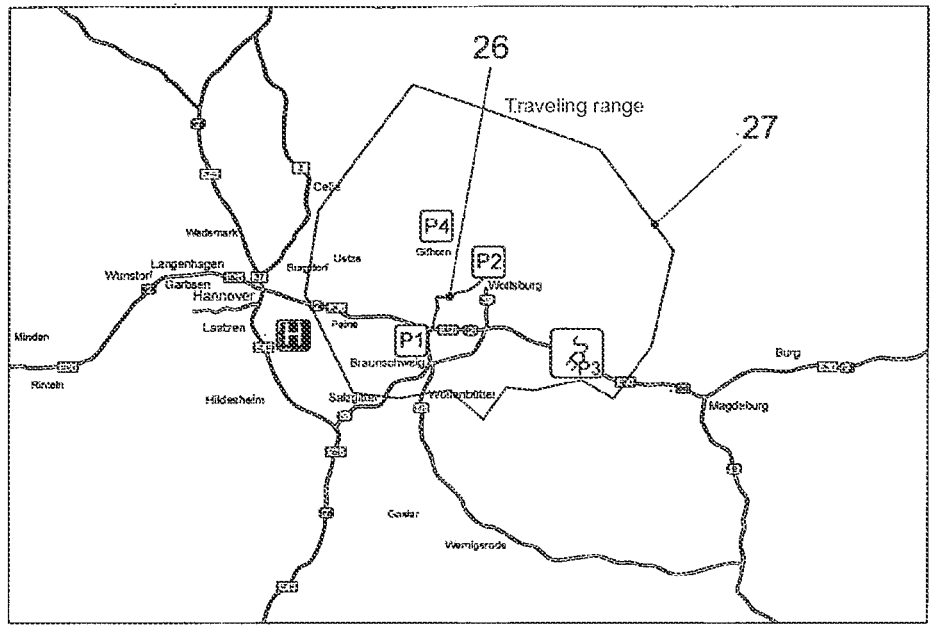

In FIG. 7, route 26 from parking facility P1 of the first destination to parking facility P2 of the second destination is indicated in the graphic map depiction. In addition, as in the visual representation according to FIG. 6, the remaining traveling range of vehicle 2 with the projected remaining amount of energy at parking facility P2 is ascertained and shown by boundary line 27.

Figure 8:
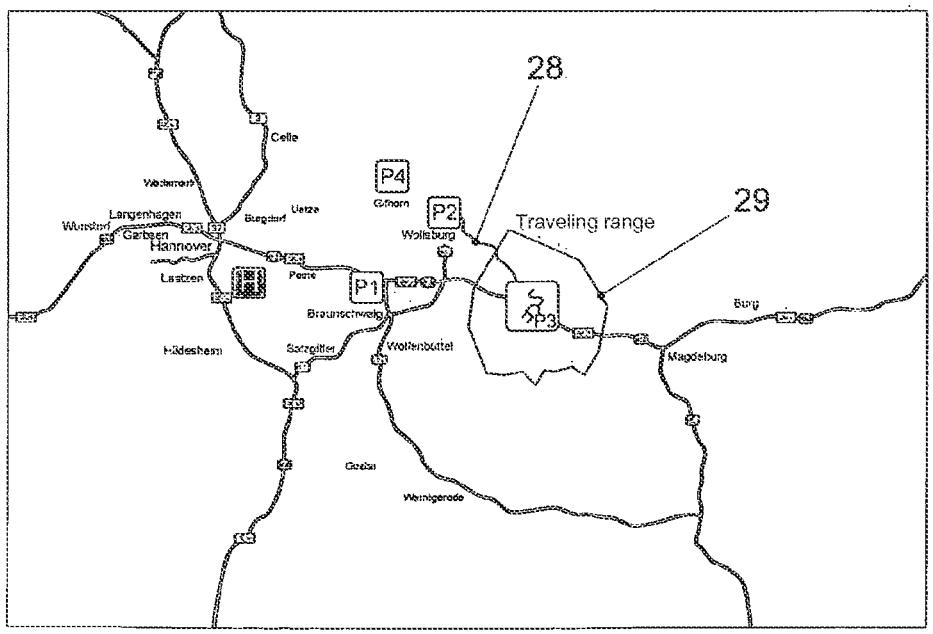
Figure 9:
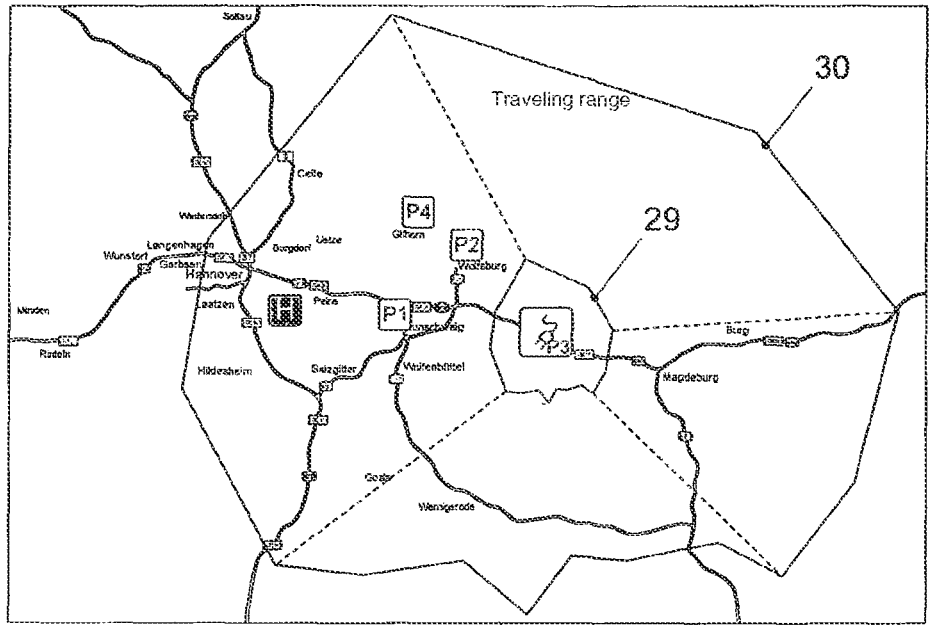

Similarly, in the representation according to FIG. 8, route 28 from parking facility P2 of the second destination to parking facility P3 of the third destination is indicated on the graphic map depiction. A boundary line 29 for the remaining traveling range at parking facility P3 is also shown. As evident from FIG. 8, this remaining traveling range is no longer sufficient for vehicle 1 to reach parking facility P4 of the fourth destination. However, the route sequence was calculated in advance such that at the third destination, a parking facility was selected which includes an energy-supply station. Thus, energy storage unit 2 of vehicle 1 is able to be replenished at parking facility P3. As shown in FIG. 9, the remaining traveling range of vehicle 1 at parking facility P3 is indicated by boundary line 29 prior to replenishing energy storage unit 2, and by boundary line 30 after the energy storage unit has been replenished. As evident from FIG. 9, after energy storage unit 2 has been replenished, the remaining traveling range is sufficient to reach parking facility P4 for the next destination. In addition, the remaining traveling range is sufficient to reach reference position H.

Figure 10:
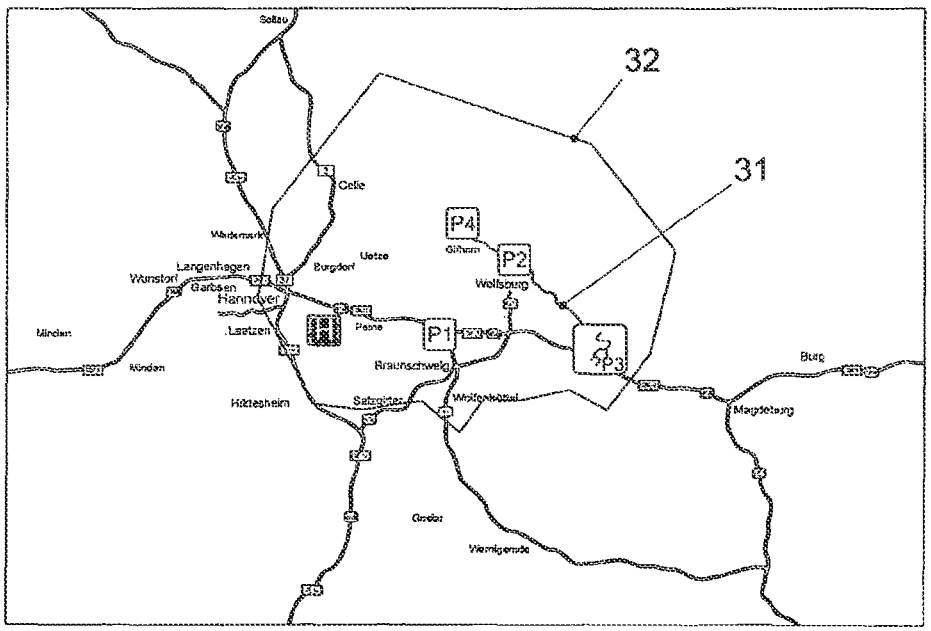

Finally, in FIG. 10, route 31 from parking facility P3 to parking facility P4 of the fourth destination is shown on the graphic map depiction. Furthermore, the remaining traveling range of vehicle 1 at parking facility P4 is shown by boundary line 32. It is especially clear that reference position H still lies within this remaining traveling range. Thus, it has been ensured in the case of the route sequence that reference position H is always able to be reached.

Figure 11:
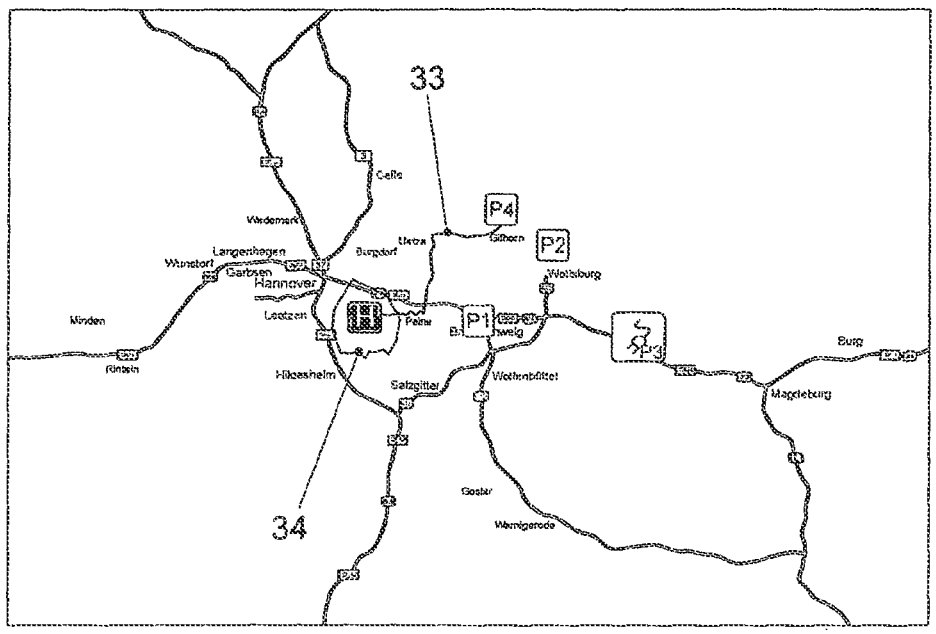

In conclusion, in FIG. 11, route 33 which leads from parking facility P4 back to reference position H is shown on the graphic map depiction. The remaining traveling range at reference position H at the end of the route sequence is also represented by boundary line 34. Thus, a relatively small amount of energy remains at the end of the route sequence. Therefore, energy storage unit 2 of the vehicle should be charged again at reference position H.

Figure 12:
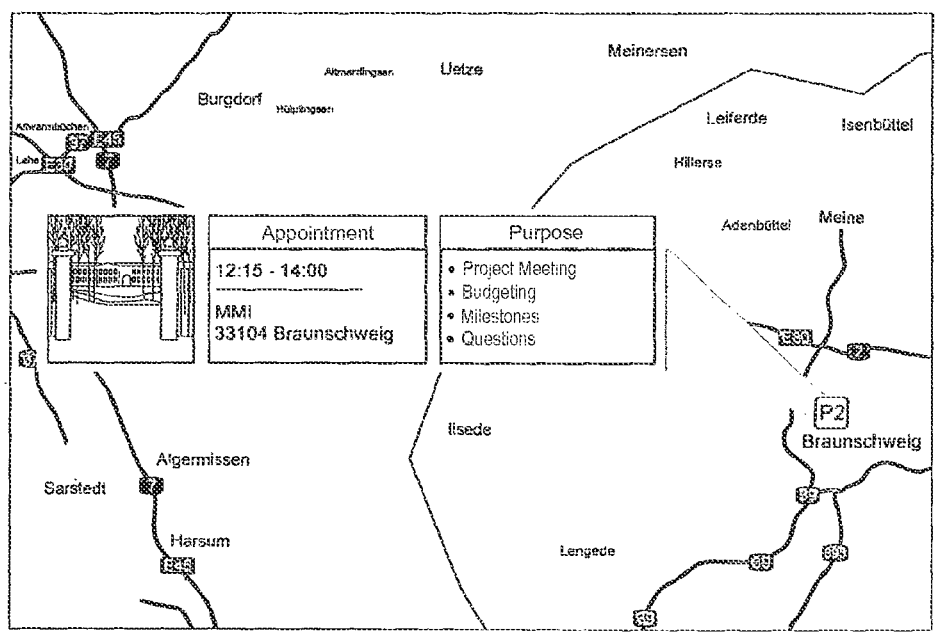

In FIG. 12, additional information is shown with respect to a parking facility P2. This additional information may be retrieved by the user by actuating input unit 4 prior to starting the trip or—as explained later—during the trip, as well.

An example for the method for planning a travel route for a vehicle was described with reference to FIG. 3. After the travel-route planning has concluded and a route sequence is available, it is used while traveling the route sequence to offer route guidance to the user in the vehicle and to adjust the route sequence, if necessary. An example for these further method steps is explained in the following:

First of all, data regarding the route sequence ascertained by arithmetic logic unit 7 is transmitted via data connections 18 and 20 to arithmetic logic unit 12 in vehicle 1. Arithmetic logic unit 12 may be configured similarly to arithmetic logic unit 7. Furthermore, data memory 14 in vehicle 1 also includes the same information as data memory 6 of computer 3. If necessary, data memories 6 and 14 may also be synchronized via data connections 18, 20.

During the trip, navigation information for traveling the route sequence is now output to the driver of vehicle 1 via display device 13. Thus, in conjunction with display device 13, arithmetic logic unit 12 provides a conventional vehicle navigation system. For that, arithmetic logic unit 12 is also coupled to a receiver for satellite signals, e.g., a GPS receiver. This receiver may also be integrated in arithmetic logic unit 12.

At the same time, data from sensor 15 concerning the amount of energy remaining in energy storage unit 2 is transmitted continually to arithmetic logic unit 12. If the deviation of the sensed amount of energy remaining in energy storage unit 2 of vehicle 1 from the projected remaining about of energy in the calculation by arithmetic logic unit 7 exceeds a certain limiting value, e.g., 10% of the projected remaining amount of energy, the route sequence may be recalculated on the basis of the sensed remaining amount of energy. If the first remaining amount of energy is less than the projected remaining amount of energy, in particular, it is checked whether the remaining amount of energy is sufficient to still reach all destinations and energy-supply stations. If this is not the case, the routine sequence is recalculated by arithmetic logic unit 12, as was explained with reference to FIG. 3, and output.

In addition, the actual position is compared to the predicted position at a specific point in time. If a deviation results in terms of time, especially if a geographical position of the route sequence has not yet been reached at a specific point in time, it is checked whether the destinations in the route sequence can still be reached at the associated times in the appointment data. In so doing, the projected amount of energy remaining in the energy storage unit of the vehicle for sections of the route sequence lying ahead is also considered. For instance, if, because of the actual energy consumption, it is necessary to insert an unplanned intermediate stop or several unplanned intermediate stops for replenishing the amount of energy in energy storage unit 2, allowance is also made for the additional time needed for this intermediate stop.

In addition, current traffic data may be considered, which is transmitted by an external server 16 to arithmetic logic unit 12 via data connections 19 and 20. An updated time for reaching the next destination may be calculated as a function of the current traffic data. In addition, the route sequence may be updated timewise. In this case, as well, it is checked whether the destinations in the route sequence are still able to be reached at the associated times in the appointment data.

If it is apparent that certain appointments cannot be honored in terms of time, an output is generated for the driver so that if necessary, he may adjust the appointments accordingly, and may inform further participants in the appointments.

In this case, arithmetic logic unit 12 calculates an adjusted route sequence in which the time data of the appointment data was adjusted or certain appointments were deleted, as was already explained above.

In addition, the likelihoods for the availability of the parking facilities in the route sequence may be updated. For instance, corresponding data may be transmitted by external server 16 to arithmetic logic unit 12 via data connections 19, 20. If it arises that a specific parking lot is no longer available, for example, arithmetic logic unit 12 adjusts the route sequence such that a different parking lot is selected for a specific destination in the route sequence. If it occurs that a parking facility having an energy-supply station is not available at the desired time in the route sequence, arithmetic logic unit 12 may select a different parking facility having an energy-supply station for an adjusted route sequence. This other parking facility having the energy-supply station is possibly at a different destination. In optimizing the route sequence, arithmetic logic unit 12 maximizes the time available for the user. In so doing, any waiting times while the amount of energy in energy storage unit 2 is being replenished are minimized, and if possible, put in times at which the user is at an appointment.

In the case of all adjustments to the route sequence during the trip, adjusted graphic map depictions and diagrams, as shown in FIGS. 4 through 12, are also generated and output via display device 13 in vehicle 1, when necessary.

By the travel-route planning according to the present invention, an integrated calculation of a trip objective having a destination sequence and corresponding restrictions in terms of locality, time and energy may be calculated. In this context, in the planning for replenishing the energy reserves of vehicle 1, all destinations in the destination sequence are considered in coupled fashion. This may be important when vehicle 1 is an electric-powered vehicle having a limited traveling range. In addition, not only are the routes for vehicle 1 considered, but also the paths of getting from parking facilities of vehicle 1 to the desired destinations. The period of time for these paths is included in the calculation of the route sequence, and especially in the selection of the parking facilities for the destinations.

LIST OF REFERENCE NUMERALS 1 vehicle
2 energy storage unit
3 computer
4 input unit
5 display device
6 data memory
7 arithmetic logic unit
8 radio interface
9 arrows
10 switching station
11 radio interface
12 arithmetic logic unit
13 display device
14 data memory
15 sensor
16 external server
17 radio interface
18, 19, 20 data connections
22 energy curve of the route sequence
23 boundary line
24 route
25 boundary line
26 route
27 boundary line
28 route
29 boundary line
30 boundary line
31 route
32 boundary line
33 route
34 boundary line

What is claimed is:

1. A method for planning a travel route for a vehicle including an energy storage unit for storing energy to power the vehicle, comprising:
   transmitting, for planning of the travel route, a destination sequence and user-specifiable time of arrival at at least one destination of the destination sequence, to an arithmetic logic unit coupled to a data memory in which data concerning a road network for the vehicle is stored,
   calculating, by the arithmetic logic unit, at least in part as a function of the user-specifiable time of arrival, a route sequence which connects destinations in the destination sequence,
   calculating a projected remaining amount of energy in the energy storage unit for traveling the route sequence,
   ascertaining, at least for a geographical position of the vehicle at one destination of the destinations in the destination sequence, based on the projected remaining amount of energy in the energy storage unit of the vehicle, the stored road network and a projected energy consumption in traveling the road network, points in the road network which are still reachable from the one destination with the projected remaining amount of energy at the one destination, and
   generating, for at least the one destination in the destination sequence, a graphic map depiction in which the geographical position of the one destination and the points in the road network which are still reachable from the one destination with the projected remaining amount of energy of the vehicle at the one destination are visually represented.

2. The method according to claim 1, wherein data concerning geographical positions of energy-supply stations for the vehicle is stored in the data memory, and the geographical positions of energy-supply stations which are still reachable from the one destination with the projected remaining amount of energy of the vehicle are visually represented in the graphic map depiction.

3. The method according to claim 1, wherein the route sequence includes a geographical position of an energy-supply station as an intermediate destination, and further comprising:
   generating a graphic map depiction for the intermediate destination, in which the geographical position of the intermediate destination and points in the road network which are still reachable prior to replenishing the energy storage unit at the energy-supply station are visually represented, and further, points in the road network which are reachable after the energy storage unit has been replenished at the energy-supply station are visually represented.

4. The method according to claim 1, further comprising:
   determining a reference position, and
   when calculating the route sequence, ensuring that the reference position lies within a remaining traveling range of the vehicle.

5. The method according to claim 4, wherein the reference position also lies within the remaining traveling range of the vehicle if, in order to reach the reference position, the vehicle must stop at an energy-supply station for the vehicle as an intermediate destination.

6. The method according to claim 1, further comprising:
while traveling the calculated route sequence, sensing an amount of energy remaining in the energy storage unit of the vehicle, and
at least upon reaching a destination in the destination sequence, generating an adjusted graphic map depiction in which the geographical position of the destination and points in the road network which are still reachable from the destination with the sensed amount of energy remaining in the energy storage unit of the vehicle are visually represented.

7. The method according to claim 1, further comprising:
while traveling the calculated route sequence, sensing an amount of energy remaining in the energy storage unit of the vehicle, and comparing the sensed amount of energy remaining to the projected remaining amount of energy in the energy storage unit of the vehicle for a corresponding route position, and
if a deviation of the sensed amount of energy remaining from the projected remaining amount of energy exceeds a limiting value, recalculating the route sequence based on the sensed amount of energy remaining.

8. The method according to claim 1, further comprising transmitting a preference with respect to at least one destination of the destination sequence, the preference including a tolerance for deviation from the user-specifiable time of arrival.

9. The method according to claim 1, wherein the destination sequence and the time of arrival are transmitted from an electronic calendar.

10. The method according to claim 1, further comprising transmitting a departure time from the at least one destination.

11. The method according to claim 1, further comprising determining the destination sequence based on appointment data, the appointment data including a beginning time and an end time of at least one appointment.

12. The method according to claim 1, further comprising determining a velocity of the vehicle for the travel route based on at least one of: road characteristics and driver behavior.

13. The method according to claim 1, wherein the calculation of the projected remaining amount of energy is based at least in part on a gradient of a road.

14. The method according to claim 1, wherein the calculating of the projected remaining amount of energy is based at least in part on characteristics of the vehicle when encountering a curve in the road.

15. The method according to claim 1, wherein the calculating a projected remaining amount of energy is performed iteratively such that the projection is based at least in part on a charge state of the energy storage unit.

16. The method according to claim 1, wherein the calculating a projected remaining amount of energy is based at least in part on expected behavior of a vehicle occupant.

17. The method according to claim 1, further comprising determining a parking facility for the at least one destination of the destination sequence based on at least one of: whether the parking facility includes an energy-supply station, a distance of the parking facility to the at least one destination, and a user walking speed.

18. The method according to claim 17, further comprising determining a parking facility based on a likelihood of reaching the at least one destination at the time of arrival, the likelihood being determined based on a user walking speed.

19. A device for planning a travel route for a vehicle including an energy storage unit for storing energy to power the vehicle, comprising:
an arithmetic logic unit,
a data memory, coupled to the arithmetic logic unit, in which data concerning a road network for the vehicle is stored,
an interface coupled to the arithmetic logic unit and adapted to transmit, for planning of the travel route, a destination sequence and user-specifiable time of arrival to the arithmetic logic unit, and
an output unit coupled to the arithmetic logic unit, wherein the arithmetic logic unit is adapted to:
calculate a projected remaining amount of energy in the energy storage unit for traveling the route sequence,
ascertain, at least for a geographical position of the vehicle at one destination of destinations in the destination sequence, based on the projected remaining amount of energy in the energy storage unit of the vehicle, the stored road network and a projected energy consumption in traveling the road network, points in the road network which are still reachable from the one destination with the projected remaining amount of energy at the one destination, and
generate and output, by the output unit, for at least the one destination in the destination sequence, a graphic map depiction, in which the geographical position of the one destination and the points in the road network which are still reachable from the one destination with the projected remaining amount of energy of the vehicle at the one destination are visually represented.

20. The device according to claim 19, wherein:
the device includes a vehicle-external module and a vehicle-internal module, the vehicle-external module including the arithmetic logic unit,
the vehicle-external module and the vehicle-internal module are coupled to each other at least intermittently for data communication via an interface adapted to transmit at least the route sequence from the vehicle-external module to the vehicle-internal module,
the vehicle-internal module includes a further arithmetic logic unit, a further output unit, a memory for storing the route sequence transmitted by the vehicle-external module, and a sensor for sensing an amount of energy remaining in the energy storage unit of the vehicle,
while traveling the calculated route sequence, the further arithmetic logic unit being adapted to compare the sensed amount of energy remaining in the energy storage unit of the vehicle to the projected remaining amount of energy in the energy storage unit of the vehicle for a corresponding route position of the route sequence stored in the memory, and if a deviation of the sensed amount of energy remaining from the projected remaining amount of energy exceeds a limiting value, the further arithmetic logic unit being adapted to generate an adjusted graphic map depiction, in which the geographical position of the one destination and the points in the road network which are still reachable from the one destination with the sensed amount of energy remaining in the energy storage unit of the vehicle are visually represented.

21. A non-transitory computer-readable medium storing program instructions that, when executed, cause a processor to perform a method, the method comprising:

transmitting, for planning of the travel route, a destination sequence and user-specifiable time of arrival at at least one of the destination sequence, to an arithmetic logic unit coupled to a data memory in which data concerning a road network for the vehicle is stored, calculating, by the arithmetic logic unit, at least in part as a function of the user-specifiable time of arrival, a route sequence which connects destinations in the destination sequence, calculating a projected remaining amount of energy in the energy storage unit for traveling the route sequence, ascertaining, at least for a geographical position of the vehicle at one destination of the destinations in the destination sequence, based on the projected remaining amount of energy in the energy storage unit of the vehicle, the stored road network and a projected energy consumption in traveling the road network, points in the road network which are still reachable from the one destination with the projected remaining amount of energy at the one destination, and generating, for at least the one destination in the destination sequence, a graphic map depiction in which the geographical position of the one destination and the points in the road network which are still reachable from the one destination with the projected remaining amount of energy of the vehicle at the one destination are visually represented.

\* \* \* \* \*